United States Patent
Reville et al.

(10) Patent No.: US 7,749,084 B2
(45) Date of Patent: Jul. 6, 2010

(54) TOOL FOR REAL-TIME GRAPHICAL EXPLORATION OF INTERCONNECTED FRIENDS AND GROUPS

(75) Inventors: Brendan K. Reville, Seattle, WA (US); Dan B. Kroymann, Kirkland, WA (US); Fabrice Odero, Seattle, WA (US); Jeffrey D. Henshaw, Redmond, WA (US); Jeffrey L. Allen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1366 days.

(21) Appl. No.: 11/006,010

(22) Filed: Dec. 7, 2004

(65) Prior Publication Data
US 2006/0121988 A1 Jun. 8, 2006

(51) Int. Cl.
*A63F 13/00* (2006.01)
(52) U.S. Cl. .............................. 463/42; 463/40; 463/41
(58) Field of Classification Search ................ 463/1, 463/40–43; 345/334, 335, 348, 356
See application file for complete search history.

(56) References Cited

U.S. PATENT DOCUMENTS

| | | | | |
|---|---|---|---|---|
| 5,905,498 A | * | 5/1999 | Diament | 715/853 |
| 6,098,130 A | * | 8/2000 | Wang | 710/100 |
| 2002/0101418 A1 | * | 8/2002 | Vernier et al. | 345/418 |
| 2002/0193162 A1 | * | 12/2002 | Walker et al. | 463/42 |
| 2003/0064807 A1 | * | 4/2003 | Walker et al. | 463/42 |
| 2003/0228908 A1 | * | 12/2003 | Caiafa et al. | 463/42 |
| 2004/0148275 A1 | | 7/2004 | Achlioptas | 707/3 |
| 2004/0176170 A1 | * | 9/2004 | Eck et al. | 463/43 |
| 2004/0224771 A1 | * | 11/2004 | Chen et al. | 463/42 |
| 2005/0202875 A1 | * | 9/2005 | Murphy et al. | 463/42 |

FOREIGN PATENT DOCUMENTS

| | | |
|---|---|---|
| EP | 1 338 966 A3 | 8/2003 |
| WO | WO 02/11832 A2 | 2/2002 |

OTHER PUBLICATIONS

Freeman, L.C., "Visualizing Social Networks," *J. of Social Structure*, 2000, 1(1), 1-16.

* cited by examiner

*Primary Examiner*—John M Hotaling
*Assistant Examiner*—Eric M Thomas
(74) *Attorney, Agent, or Firm*—Woodcock Washburn LLP (57) ABSTRACT

The present invention is direct to a Live Network Explorer (LNE) which allows users to graphically navigate through a web of interconnected friends on a gaming console. The LNE provides a real-time graphical representation of friend-of-friend relationships, with the currently-viewed user as a visual node in the screen center. The center node is surrounded by nodes representing that user's friends. Real-time animation is used to represent transitions as the user navigates from person to person. The LNE also represents groups as a visual node in this graphically interconnected web so that the user can travel to a group that a person belongs to, and can see all the people inside the group by connections. The user can navigate to any of these people in the group. The user can click on a person to bring up their digital identity details.

14 Claims, 6 Drawing Sheets

TOOL FOR REAL-TIME GRAPHICAL EXPLORATION OF INTERCONNECTED FRIENDS AND GROUPS

FIELD OF THE INVENTION

This invention generally relates to the field of gaming and multimedia devices. In particular, the present invention is directed to a method of graphically exploring user and group relationships.

BACKGROUND OF THE INVENTION

Typical friend-of-friend exploration on the web is not a friendly experience for mainstream users because it involves navigating websites and often looking at flat lists of people. Typically, these web sites provide services that refer people to friends, or friends of friends, or friends of friends of friends, and so on. When user signs up, they provide a list of list of interests and asked for a list of their friends and their e-mail addresses. If their friends also sign up, they are asked to confirm their relationship to the inviter. Once these social links are established, users can traverse the entire web of contacts, finding people they would like to meet and sending them a message. The invitation feature creates a system of validating social relationships and provides a kind of virtual "vouch" that protects participants from random contacts.

There are several limitations of these services, in that they are not real-time, lack graphical navigation and do not provide for relationships other than friends. What is needed is a system that overcomes these and other limitations to provide a real-time graphical system to allow users to simulate a graphical web of interconnected nodes, and enhancing the quality of the user's visualization of the relationships. The present invention provides such a solution.

SUMMARY OF THE INVENTION

The present invention is direct to a Live Network Explorer (LNE) which allows users to graphically navigate through a web of interconnected friends on a gaming console. The LNE provides a real-time graphical representation of friend-of-friend relationships, with the currently-viewed user as a visual node in the screen center. The center node is surrounded by nodes representing that user's friends. Real-time animation is used to represent transitions as the user navigates from person to person. The LNE also represents groups as a visual node in this graphically interconnected web so that the user can travel to a group that a person belongs to, and can see all the people inside the group by connections. The user can navigate to any of these people in the group. The user can click on a person to bring up their digital identity details.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
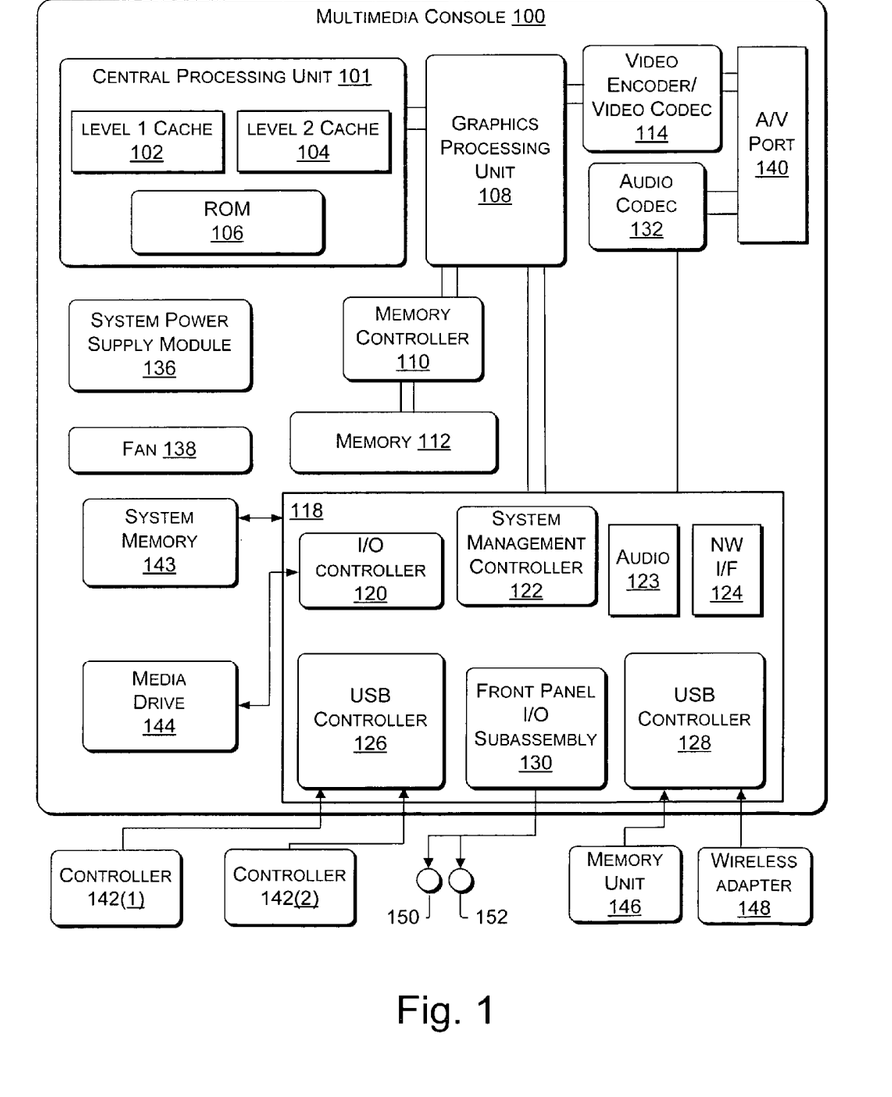
FIG. 1 is a block diagram showing a gaming console in which aspects of the present invention may be implemented.

FIG. 1 illustrates the functional components of a multimedia/gaming console 100 in which certain aspects of the present invention may be implemented. The multimedia console 100 has a central processing unit (CPU) 101 having a level 1 cache 102, a level 2 cache 104, and a flash ROM (Read Only Memory) 106. The level 1 cache 102 and a level 2 cache 104 temporarily store data and hence reduce the number of memory access cycles, thereby improving processing speed and throughput. The CPU 101 may be provided having more than one core, and thus, additional level 1 and level 2 caches 102 and 104. The flash ROM 106 may store executable code that is loaded during an initial phase of a boot process when the multimedia console 100 is powered ON.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory device 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless adapter components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity and stereo processing. Audio data is carried between the audio processing unit 123 and the audio codec 132 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 100 is powered ON, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 allows one or more users to interact with the system, watch movies, or listen to music. However, with the integration of broadband connectivity made available through the network interface 124 or the wireless adapter 148, the multimedia console 100 may further be operated as a participant in a larger network community.

When the multimedia console 100 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 100 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 101 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 142(1) and 142(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches.

The present invention provides a Live Network Explorer (LNE) which allows people to graphically navigate through a web of interconnected friends on the console 100. More specifically, the LNE provides a real-time graphical representation of friend-of-friend relationships, with the currently-viewed user as a visual node in the screen center. The user is surrounded by nodes representing the user's friends and real-time animation is used to show transition as the user navigates from person to person.

The LNE also represents groups as a visual node in the graphically interconnected web, so that the user can travel to a group that a person belongs to. The user can see all the people inside the group by connections and then navigate to any of these people. The user can click on a person to bring up their digital identity details.

Figure 2:
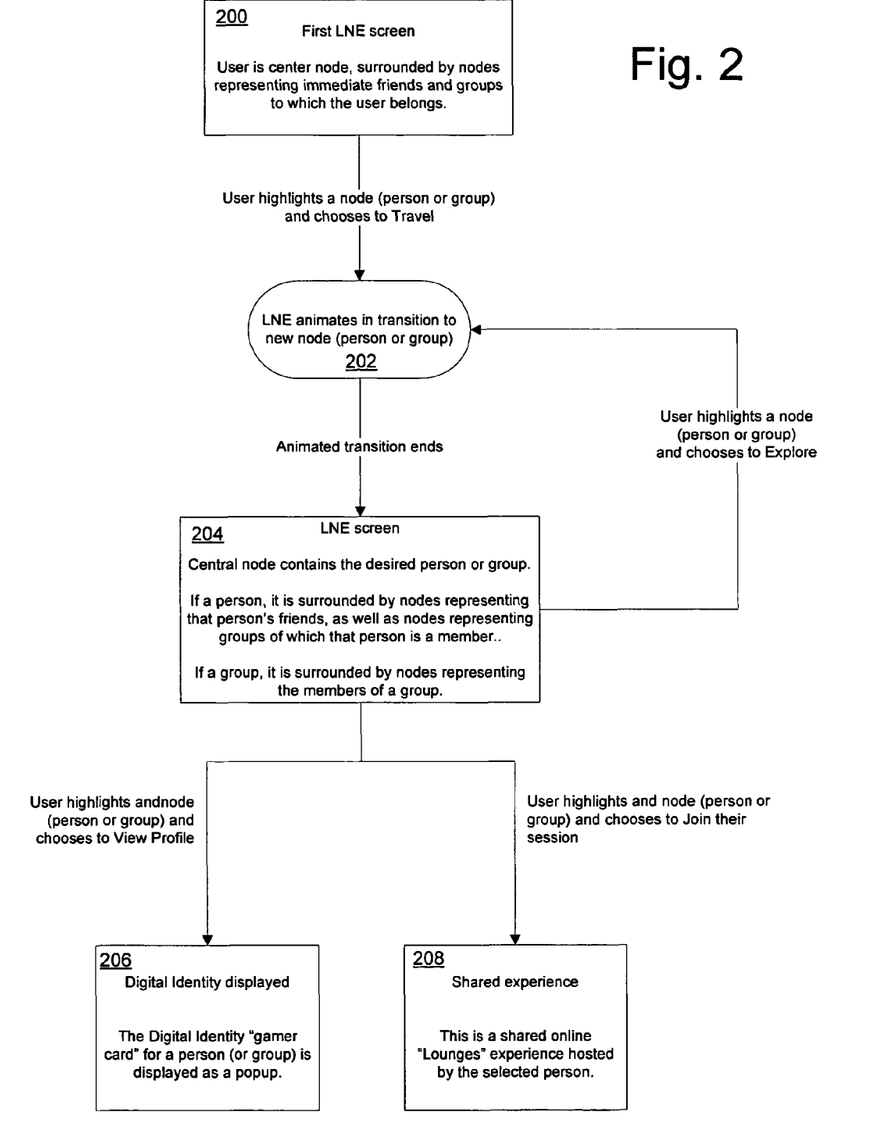
FIG. 2 illustrates a high level abstraction of the user experience flow.
Figure 3:
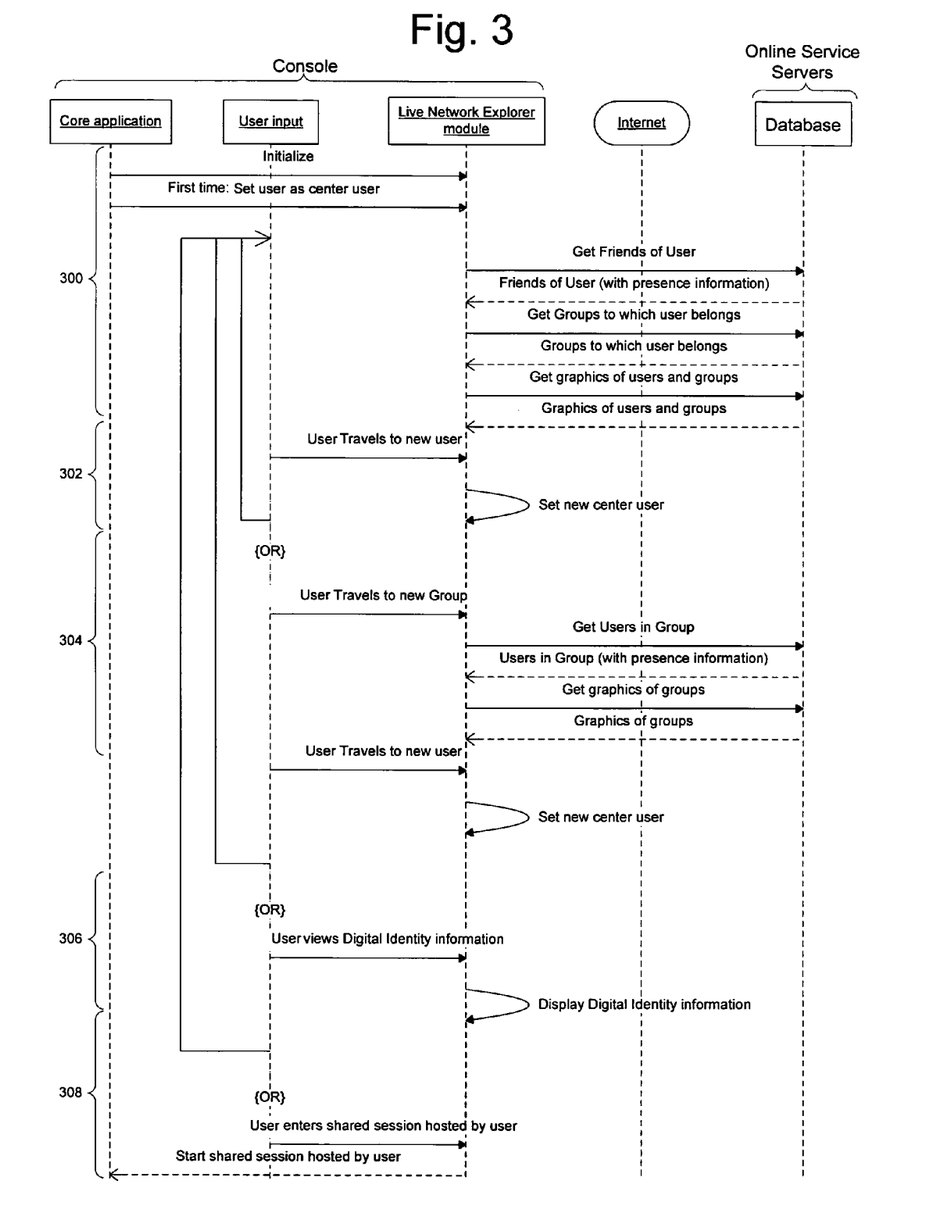
FIG. 3 illustrates a call sequence diagram indicating the calls between an application running on the gaming console, a Live Network Explorer module, and the data retrieval from an online service.
Figure 4:
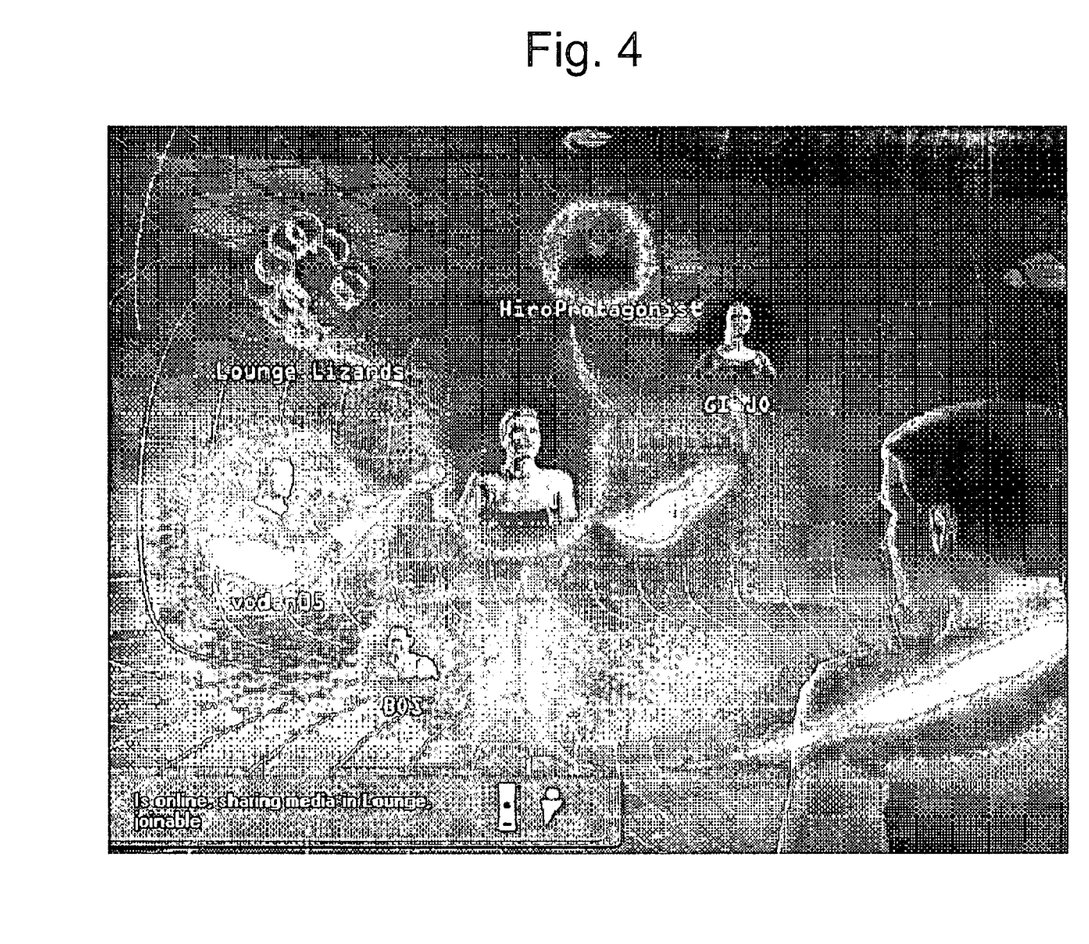
FIGS. 4-6 illustrate various graphical user interfaces in accordance with the present invention.
Figure 5:
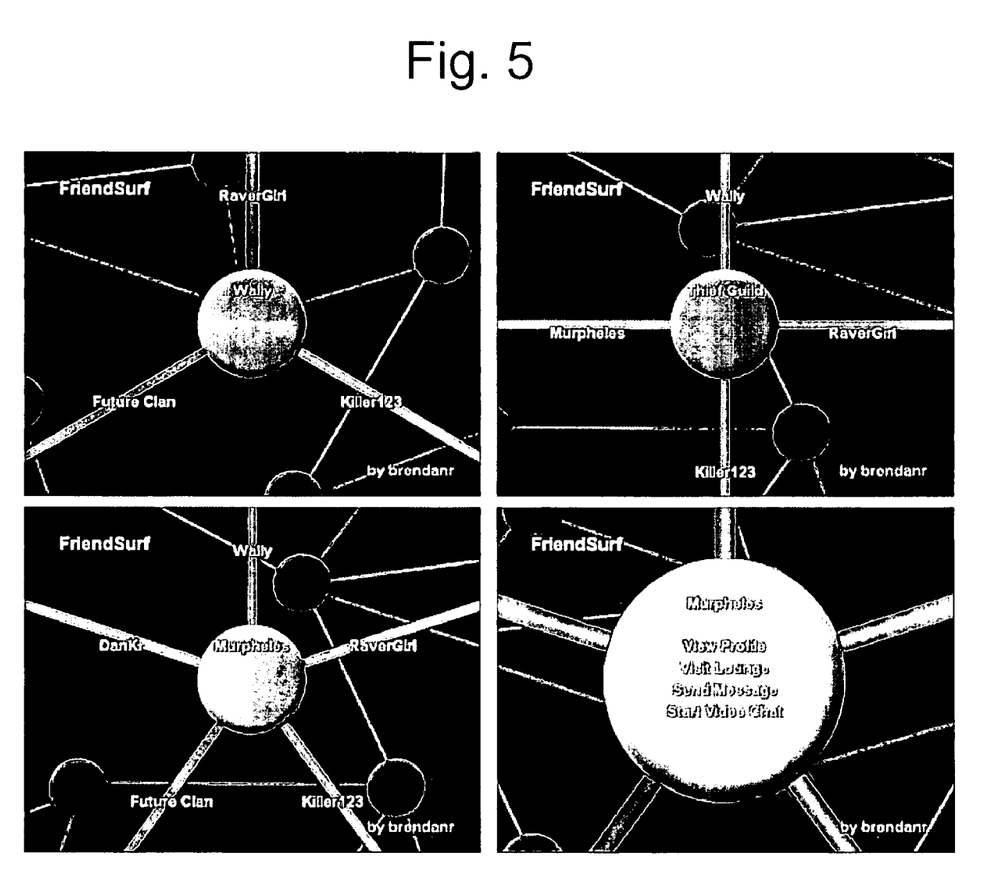
Figure 6:
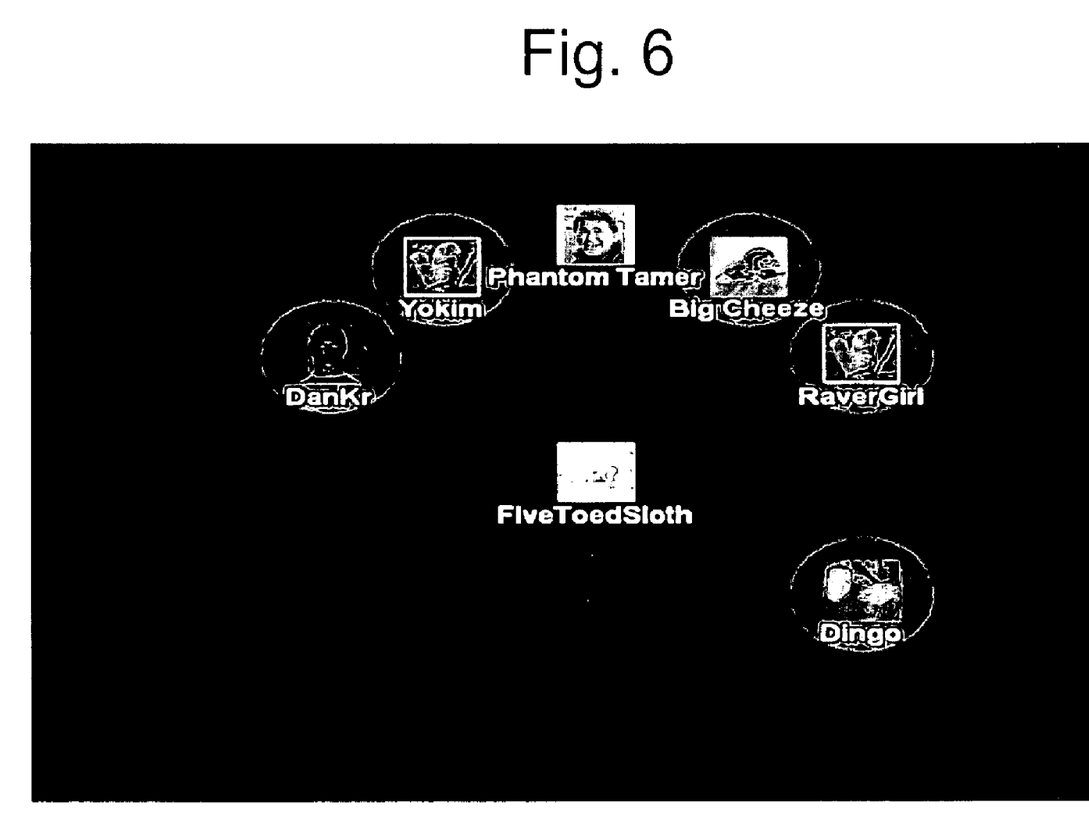

Software running on the console 100 will execute a module containing the LNE. FIGS. 2-3 illustrate a flow of the operation of the present invention and FIGS. 4-6 provide several exemplary graphical user interfaces. Referring now to FIGS. 2-3, the LNE will present a node in the center of the screen containing a graphical representation of a user (step 200). The LNE will query online service servers, via e.g., the Internet, for a list of the user's friends and groups to which they belong and renders a first display with the user at a center (reference numeral 300). Nodes surrounding the central node represent that user's friends and groups to which that user belongs. The surrounding nodes will also contain a graphical representation of their associated user, and are rendered to indicate their current status, for example whether they are online or offline. Nodes representing groups will also contain a graphical representation of the group.

At any point, the user may highlight one of the nodes. If the user highlights a person's node, the user may choose to "travel" to that person's node (step 202). A visual transition will occur in which the chosen person's node becomes the central node, and all of the surrounding nodes indicate that person's friends and groups to which they belong (step 204; reference numeral 302). The LNE will also query the online service servers for the "presence" information of each user to determine whether they are online, offline, playing a game, and so on. By continuing to travel, the user can explore friends, friends-of-friends, friends-of-friends-of-friends, and so on.

If the user chooses to travel to a group's node, the behavior is similar, except that when a group node is the central one, the surrounding nodes represent users that belong to that group (reference numeral 304). Again, the LNE will also query the online service servers for the "presence" information of each user of the group.

After traveling to a person's or group's node, the user may choose to obtain information about the digital identity of the person or group (step 206; reference numeral 306) or join a session of the person or group (step 208; reference numeral 308) to share an online experience in a "lounge" setting. By drawing connectors from the central node to its surrounding ones, it makes it possible to visually imply an interconnected "web" or "graph" of users as the user travels between these connections.

While the present invention has been described in connection with the preferred embodiments of the various Figs., it is to be understood that other similar embodiments may be used or modifications and additions may be made to the described embodiment for performing the same function of the present invention without deviating therefrom.

What is claimed is:

1. A gaming console, comprising:
   a memory;
   a microprocessor;
   a network interface; and
   an instantiated live network explorer module;
   the instantiated live network explorer module providing a graphical user interface,
   the graphical user interface:
      identifying a user of the console;
      obtaining by way of the network interface a first list including friends of the identified user and groups to which the identified user belongs;
      displaying to the user of the console in a corresponding display a first, centrally positioned node representative of the user, the first node being centrally positioned within the display, and additional nodes each positioned in a surrounding position of the display to collectively surround the centrally positioned first node, each additional surrounding node being representative of a friend of said user from the list or a group from the list to which said user belongs;
      receiving from the user a selection of one of the displayed additional surrounding nodes, the selected node corresponding to one of a friend of the user and a group of the user; and
      moving the selected node from the surrounding position thereof to the central position of the display.

2. The gaming console of claim 1, wherein said live network explorer module queries an online service to determine presence information of said friends and said groups.

3. The gaming console of claim 1, wherein digital identity information regarding said friends of said user or said groups to which said user belongs is accessible via a selection of one of said additional nodes.

4. The gaming console of claim 1, wherein said user enters a shared session with said friends of said user or said groups to which said user belongs via a selection of one of said additional nodes.

5. A method of providing a real-time graphical representation of friend-of-friend relationships, comprising:
   receiving an input identifying a user of a console;
   obtaining by way of a network interface a first list including friends of the identified user and groups to which the identified user belongs;
   displaying to the user of the console in a corresponding display a first node, said first node being representative of said user, the first node being centrally positioned from opposing left and right sides of the display and opposing top and bottom sides of the display;
   displaying to the user of the console in the display additional nodes each positioned in a surrounding position of the display to collectively surround said first node in the central position, each additional surrounding node being representative of a friend of said user from the list or a group from the list to which said user belongs;
   receiving from the user a selection of one of the displayed additional surrounding nodes, the selected node corresponding to one of a friend of the user and a group of the user; and
   moving the selected node from the surrounding position thereof to the central position of the display.

6. The method of claim 5, further comprising querying an online service to determine presence information of said friends and said groups.

7. The method of claim 5, further comprising retrieving digital identity information regarding said friends of said user or said groups to which said user belongs.

8. The method of claim 5, further comprising entering a shared session with said friends of said user or said groups to which said user belongs.

9. A method of rendering a user interface on a gaming console for graphically navigating relationships, comprising:
   receiving an input identifying a user of the console;
   obtaining by way of a network interface a first list including friends of the identified user and groups to which the identified user belongs;
   displaying to the user of the console in a corresponding display a first node, said first node being representative of said user, the first node being centrally positioned from opposing left and right sides of the display and from opposing top and bottom sides of the display;
   displaying to the user of the console in the display additional nodes each positioned in a surrounding position of the display to collectively surround said first node in the central position, each additional surrounding node being representative of a friend of said user from the list or a group from the list to which said user belongs;
   receiving from the user a selection of one of the displayed additional surrounding nodes, the selected node corresponding to one of a friend of the user and a group of the user; and
   moving the selected node from the surrounding position thereof to the central position of the display.

10. The method of claim 9, further comprising displaying digital identity information regarding said friends of said user or said groups to which said user belongs.

11. The method of claim 9, further comprising:
   entering a shared session with said friends of said user or said groups to which said user belongs; and
   displaying said shared session in said user interface.

12. The console of claim 1, wherein:
   the graphical user interface if the selected node corresponds to a friend of the user subsequently:
      obtaining by way of the network interface a second list including friends of the friend of the user and groups to which the friend of the user belongs; and
      displaying to the user of the console in the display a second, centrally positioned node representative of the friend of the user, and additional nodes in the display surrounding the second node, each additional node being representative of a friend of the friend of said user from the second list or a group from the second list to which said friend of the user belongs; and the graphical user interface if the selected node corresponds to a group of the user subsequently:

obtaining by way of the network interface a second list including members of the group; and     displaying to the user of the console in the display a second, centrally positioned node representative of the group, and additional nodes in the display surrounding the second node, each additional node being representative of a member of the group.

13. The method of claim 5, further comprising:

if the selected node corresponds to a friend of the user, subsequently:

obtaining by way of the network interface a second list including friends of the friend of the user and groups to which the friend of the user belongs; and     displaying to the user of the console in the display a second, centrally positioned node representative of the friend of the user, and additional nodes in the display surrounding the second node, each additional node being representative of a friend of the friend of said user from the second list or a group from the second list to which said friend of the user belongs; and if the selected node corresponds to a group of the user, subsequently:

obtaining by way of the network interface a second list including members of the group; and     displaying to the user of the console in the display a second, centrally positioned node representative of the group, and additional nodes in the display surrounding the second node, each additional node being representative of a member of the group.

14. The method of claim 9, further comprising:

if the selected node corresponds to a friend of the user, subsequently:

obtaining by way of the network interface a second list including friends of the friend of the user and groups to which the friend of the user belongs; and     displaying to the user of the console in the display a centered second node representative of the friend of the user, and additional nodes in the display surrounding the second node, each additional node being representative of a friend of the friend of said user from the second list or a group from the second list to which said friend of the user belongs; and if the selected node corresponds to a group of the user, subsequently:

obtaining by way of the network interface a second list including members of the group; and displaying to the user of the console in the display a centered second node representative of the group, and additional nodes in the display surrounding the second node, each additional node being representative of a member of the group.

\* \* \* \* \*